United States Patent [19]
Bochnak

[11] 3,972,396
[45] Aug. 3, 1976

[54] LEAKAGE DETECTOR WITH BACK PRESSURE SENSOR

[75] Inventor: Gregory Bochnak, New Hall, Calif.

[73] Assignee: United Technologies Corporation, Hartford, Conn.

[22] Filed: June 5, 1975

[21] Appl. No.: 584,237

[52] U.S. Cl. .................................. 188/312; 277/2; 277/15; 188/318; 188/322; 92/86
[51] Int. Cl.² .......................................... F16F 9/20
[58] Field of Search ..................... 277/2, 59, 29, 15; 92/5 R, 86, 166; 188/312, 322, 318

[56] References Cited
UNITED STATES PATENTS
3,070,023  12/1962  Glasgow .............................. 92/166
3,768,371  10/1973  Orme ..................................... 92/86

*Primary Examiner*—Samuel B. Rothberg
*Attorney, Agent, or Firm*—Maurice B. Tasker; Vernon F. Hauschild

[57] ABSTRACT

A hydraulic damper for controlling the lag-lead movements of a helicopter rotor blade has dual oil seals on its piston rods. A fluid conduit connects the area between the seals to the area beneath the piston of a cylinder-and-piston type indicator and also through a fluid restriction back into an open fluid system. A bypass conduit is extended from the fluid conduit on the downstream side of the restriction to the area above the indicator piston so that any back pressure in the fluid system which creates a pressure rise of the other side of the restriction also acts on the upper end of the indicator piston.

6 Claims, 3 Drawing Figures

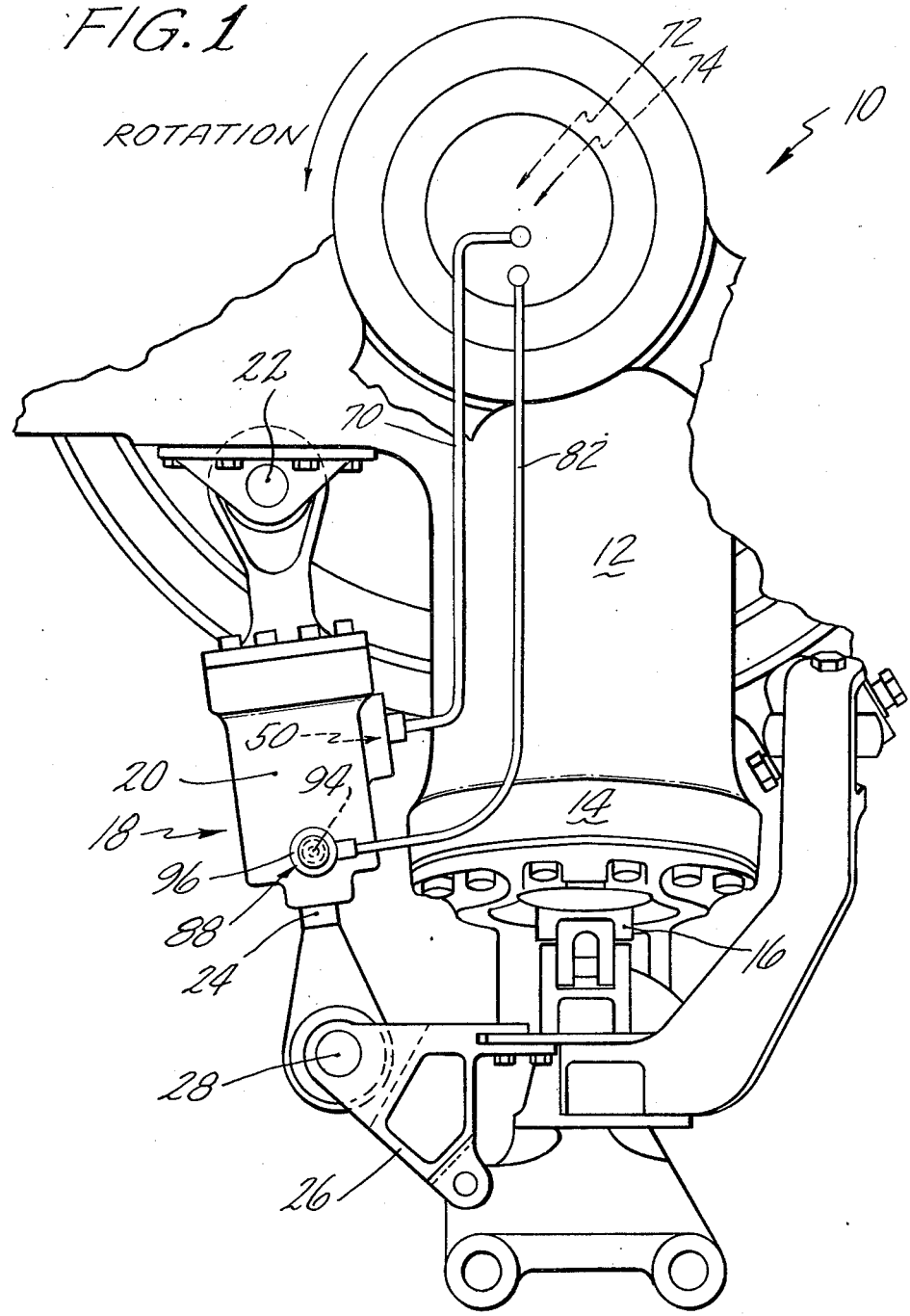

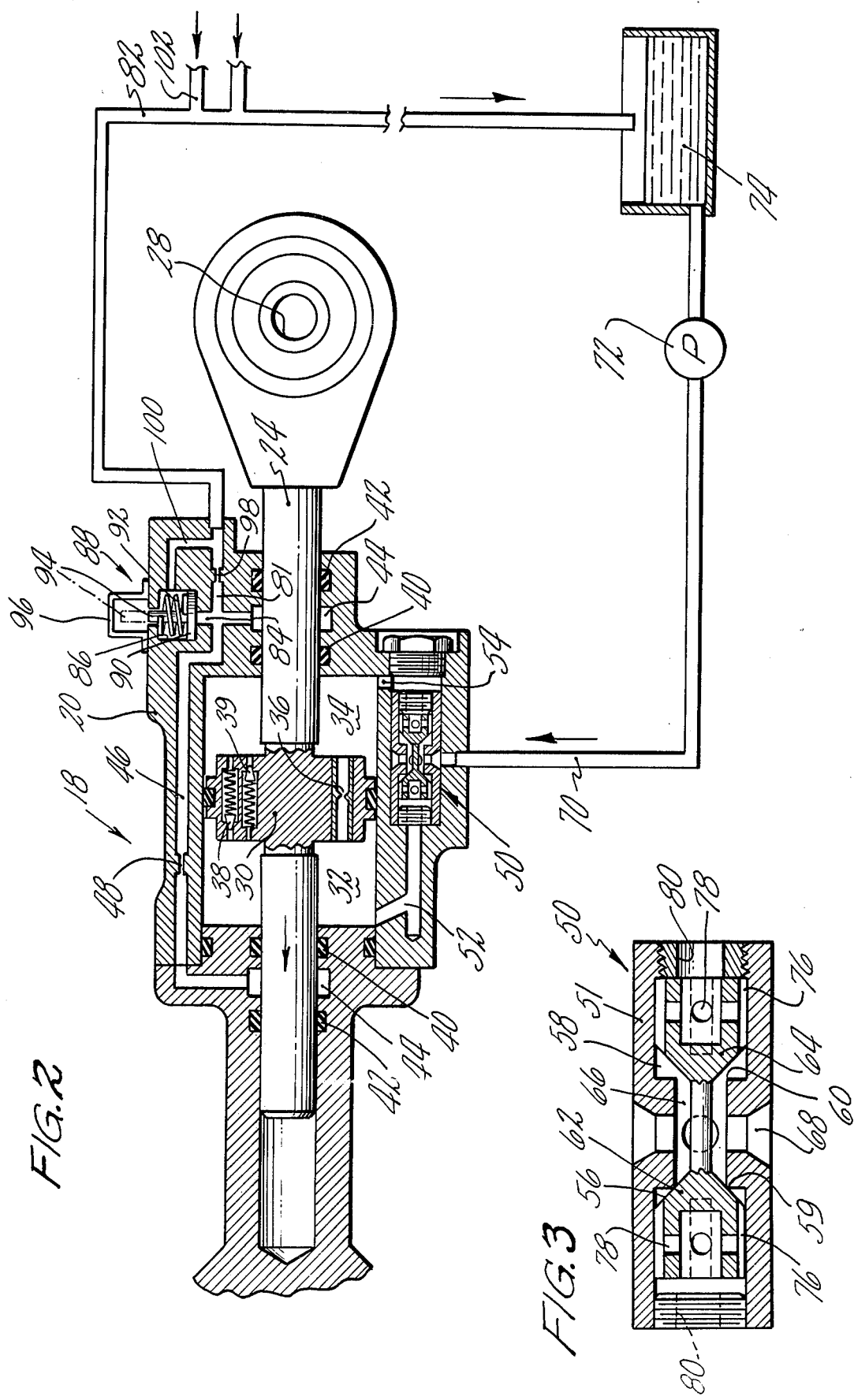

3,972,396

LEAKAGE DETECTOR WITH BACK PRESSURE SENSOR

CROSS-REFERENCE TO RELATED APPLICATIONS

An application of Robert C. Rybicki, Ser. No. 584,238 filed concurrently with this application, shows and claims a leakage indicator for a closed fluid system damper having dual seals on the piston rods of the damper. The present invention relates to a leakage indicator for an open fluid system damper having dual seals on the piston rod of the damper.

BACKGROUND OF THE INVENTION

1. Field of the Invention

This invention relates to hydraulic dampers of the cylinder-and-piston type used for controlling the lag-lead movements of helicopter blades, and particularly to means for accurately indicating when a high pressure seal on the piston rod of the damper has become worn and is leaking oil excessively.

2. Description of the Prior Art

Dual seals have been used on the shafts of dampers and servomotors, with fluid pressure indicators connected to the area between seals to indicate leakage past the primary seal. U.S. Pat. No. 1,943,578 issued Jan. 16, 1934 to G. E. Bigelow shows such an arrangement applied to a high pressure centrifugal pump shaft. The area between the seals is connected to a conduit containing a restriction (valve) to a low pressure fluid system and a pressure gage is connected to the conduit between the restriction and the seals.

A disadvantage of this prior art structure is that a pressure built up in the return line for the leaked fluid, thereby giving a false indication of excessive leakage. This is particularly troublesome where the leaked-fluid line discharges into a fluid return system which is connected to other hydraulic devices as for example a helicopter rotor head which has a plurality of dampers operating concurrently.

SUMMARY OF THE INVENTION

It is an object of this invention to provide a rate-of-leakage indicator for the high pressure seal of a damper which is reliable in operation even if fluctuations in pressure take place in the hydraulic system to which the indicator is connected.

It is a further object of this invention to provide a leakage indicator that will respond to leakage pressure only and not to back pressure in the basic return conduits.

In furtherance of these broad objects of this invention, spaced primary and secondary seals are provided on the damper rods, and the cavities between these seals are connected by a fluid line through a fixed restriction to the system return line. A leakage indicator, consisting of a cylinder and a fluid responsive member therein, is connected to the fluid line between the seals and the restriction with the leakage fluid acting on the bottom of the fluid responsive member. Also in accordance with this invention a fluid connection is made from the fluid line downstream of the restriction to the upper, or remote, side of the fluid responsive member of the leakage indicator.

It is therefore a further object of this invention to provide two dynamic seals for a damper rod having a conduit leading to the fluid responsive member of a detector and to system return; a fixed restriction in the line on the other side of the detector from the seals; and a fluid line on the opposite side of the restriction from the indicator connected to the space above the fluid responsive member of the indicator so that any back pressure in the system return which reacts back through the restriction to act on the near side of the fluid responsive member will also act equally on the remote side thereof.

A still further object of this invention is generally to improve the construction and operation of leak detectors for hydraulic dampers.

BRIEF DESCRIPTION OF THE DRAWINGS

FIG. 1 is a partial plan view of a helicopter rotor showing the mounting for one blade thereon together with a hydraulic damper for controlling the lag-lead movement of the blade, FIG. 2 is a schematic showing of the hydraulic damper equipped with the improved leakage detector system of this invention, and FIG. 3 is an enlarged view of the shuttle valve incorporated in the damper showing its connections to the fluid system.

DESCRIPTION OF THE PREFERRED EMBODIMENT

In FIG. 1 a helicopter rotor head is shown at 10, partially broken away to facilitate illustration, which includes a hub 12 having a plurality of radially extended blade supporting arms 14, one of which is shown in FIG. 1. Each arm carries a blade spindle 16 mounted therein in an elastomeric bearing permitting flapping, lag-lead and pitch changing movements of its blade.

A hydraulic damper 18 is connected between each blade and the hub 12 for controlling the lag-lead movements of the blade including a cylinder 20 connected to the hub by a pivot pin 22 and to the blade by a piston rod 24 connected to bracket 26 by pivot pin 28. Damper 18, as shown in FIG. 2, includes a piston 30 on rod 24 which divides the cylinder into two chambers 32,34. The piston is provided with the usual restricted passage 36 and oppositely opening check valves 38,39 which are designed to open only under abnormal pressure conditions in chambers 32,34.

At each of its ends cylinder 20 is provided with dual seals 40,42 surrounding piston rod 24. These seals are located on opposite sides of an annular collector and lubrication cavity 44 which surrounds rod 24. Seals 40 are the primary seals located adjacent damper chambers 32,34, and 42 are secondary seals. The annular cavities 44 collect fluid which leaks past the primary seals and are connected by a cored passage 46 in the damper cylinder which has a restriction 48.

Cylinder 20 also has a shuttle valve 50 in a chamber in its sidewall including a cylinder 51 the opposite ends of which are connected with the damper chambers 32,34 by cored passages 52,54, respectively. Cylinder 51 has two valve chambers 56,58 provided with valve seats 59,60 on which connected valves 62,64 alternately seat as they are reciprocated by the fluid pressure in chambers 32,34. Chamber 66 between valve seats 59,60 is connected through passages 68 in cylinder wall 51 with a conduit 70 leading to a pump 72 and a fluid sump 74. Spool valves 62,64 have passages 76 in their peripheries which communicate with radial passages 78 and axial passages 80 which are in communication with cored passages 52,54.

Passage 46 which receives leakage fluid passed through the two primary seals 40 has an extension 81 which connects through conduit 82 with sump 74. A passage 84 connects passage 46 with cylinder 86 of a leakage indicator 88. A piston 90 in cylinder 86 is acted upon by leakage fluid entering through passage 84 which compresses a spring 92 in cylinder 86. Piston 90 has a stem 94 which enters within an inverted transparent cap 96 on the exterior surface of cylinder 20 to indicate that excess leakage through a primary seal is taking place. A fixed restriction 98 in passage 81 permits the leakage fluid to build up sufficient pressure in passage 84 to operate the indicator 88 when the leakage rate reaches a predetermined amount. By the term "fixed restriction" as used in the specification and claims is meant a continuously open passage of reduced diameter having no moving parts and hence of constant cross sectional area. Preferably some means is provided to give a continuing indication that the indicator has operated. This may be a simple latch which engages and holds the raised stem 94 or the stem may engage and trip some member to give a lasting visual indication that the indicator has operated. These devices are all well known and have not been shown.

In accordance with this invention, an unobstructed fluid connection 100 is provided between passage 81, downstream of the restriction 98, and cylinder 86 above the piston 90 insuring that pressure built up in the return line 82 for leakage fluid causing a back pressure to build up on the system side of restriction 98 and acting on piston 90 will not give a false indication of excess leakage from the primary seals. Return line back pressure will be balanced on both sides of piston 90.

In the operation of the open leaked-fluid system above described, as piston 30 reciprocates relative to absorber cylinder 20 pressure is built up in one of chambers 32,34. For example, as shown in FIG. 2 piston 30 is moving in the direction of the arrow, i.e., toward the left as viewed in FIG. 2 and a high pressure is being built up in chamber 32. This subjects primary seal 40 at this end of damper cylinder 20 to high pressure, which may cause a certain amount of leakage past this seal, depending upon its condition, into annular space 44. This high pressure also is transmitted through passage 52 to the shuttle valve where it acts upon valve member 62, causing the latter to move to the right and engage its seat 59. This movement of the shuttle valve causes valve member 64 to move away from its seat. Fluid from pump 72 can now flow through the shuttle valve and passage 54 into chamber 34 to occupy the space displaced by piston 30 so the damper will be ready for the return stroke, since any leakage fluid past the primary seals will have been replaced at this time. As pressure builds up in chamber 34 on the return stroke of piston 30, the shuttle valve will be caused to move to the left opening valve member 62 and closing valve member 64. This use of a shuttle valve is well known in the art.

When the damper is first placed in service, leakage past the primary seals will be negligible. As the damper continues in service and the seals wear, leakage will increase but restriction 98 will be able to pass the fluid without causing sufficient pressure to build up beneath piston 90 to compress spring 92 and project the stem of piston 90 into cap 96. When, however, a primary seal is no longer able to sustain the damper pressure, the volume of leaking fluid cannot pass through restriction 98 and the pressure builds up beneath piston 90 causing an indication of seal failure.

Difficulty has been experienced in the system above described prior to installation of conduit 100 due to back pressure from return pipe 82 which causes leaked fluid to be forced back through restriction 98, causing an untimely indication of excess leakage by indicator 88. This condition may arise for a number of reasons but is particularly apt to happen in a system where other hydraulic apparatus is connected to vent into the same conduit 82, as from conduits indicated at 102. This difficulty is overcome completely by the pressure equalization conduit 100 which connects the fluid return line 82 downstream of restriction 98 with cylinder 86 above piston 90. Then any back pressure which is built up beneath piston 90 is equalized by the same pressure acting above piston 90, and the indicator will respond to leakage pressure only.

While I have shown and described in considerable detail one embodiment of my invention which is particularly attractive for use with rotor blade dampers, I do not wish to be limited to the exact details elaborated herein as many variations in construction will occur to those skilled in this art which fall within the scope of the appended claims. This invention is equally applicable to hydraulic servomotors, for example. Also, various forms of fluid indicators may be substituted for the cylinder-and-piston type shown herein which employ equivalent elements such as diaphragms, bellows or roll seals as their fluid actuated element.

I claim:

1. A hydraulic damper for controlling lag-lead movements of a helicopter rotor blade comprising a cylinder, a piston reciprocable in said cylinder having a piston rod extended through an end wall of said cylinder, primary and secondary seals in said end wall surrounding and engaging said rod, a cavity about said rod between said seals, a fluid leakage line extending from said cavity having a fixed restriction therein, a leakage indicator including a chamber communicating with said leakage line upstream of said restriction and a fluid responsive member in said chamber, and an unobstructed pressure equalization line having a fluid connection at one of its ends to said leakage line downstream from said restriction and having a fluid connection at its other end to the chamber of said leakage indicator above the fluid responsive member therein.

2. A hydraulic damper for controlling lag-lead movements of a helicopter rotor blade comprising a cylinder, a piston reciprocable in said cylinder having piston rods extended through opposite end walls of said cylinder, primary and secondary seals in each end wall engaging said rods, a cavity about each rod between its primary and secondary seals, a fluid line connecting said cavities, means for collecting leakage fluid including a fluid line extending from said connecting line having a fixed restriction therein, a leakage-fluid operated indicator including a cylinder and a piston therein, said cylinder having a fluid connection beneath said piston with said extended fluid line upstream from said restriction therein, and means for preventing false indications of excessive leakage including an unobstructed pressure equalization line having a fluid connection at one of its ends to said indicator cylinder above its piston and having a fluid connection at its other end to said extended fluid line downstream of said restriction therein.

3. A hydraulic damper for controlling the lag-lead movements of helicopter rotor blades comprising a cylinder and a piston, a piston rod extended through a wall of said cylinder, primary and secondary seals in said wall surrounding and engaging said rod, an annular cavity about said rod between said seals for collecting leakage fluid, a fluid passage communicating with said cavity having a fixed restriction therein, a leakage indicator having a chamber and a fluid responsive member therein, a compression spring in said indicator chamber above said fluid responsive member, a fluid connection from said indicator chamber beneath said fluid responsive member to said fluid passage upstream of said restriction, and means for preventing untimely operation due to backup of fluid through said restriction including an unobstructed fluid line having a connection at one of its ends to said fluid passage at a point downstream of said restriction and having a connection at its other end with said indicator chamber above said fluid responsive member in the latter.

4. A hydraulic damper for controlling the lag-lead movements of helicopter rotor blades comprising a cylinder and a piston reciprocable therein, a piston rod extended through a wall of said cylinder, axially spaced primary and secondary seals between said cylinder wall and said rod, a cavity in said wall surrounding said rod, a leaked-fluid line connected to said cavity for conducting fluid from the latter to the damper fluid system, a fixed restriction in said leaked-fluid line, an indicator responsive to the rate of fluid leaking into said cavity including an indicator chamber connected to said leaked-fluid line upstream of said restriction, a fluid pressure responsive member in said indicator chamber, and means for maintaining the same pressure on the remote side of said indicator member as that prevailing in said leaked-fluid line downstream of said restriction, said means including an unobstructed fluid conduit having a connection at one end to said indicator chamber above said fluid responsive member therein and having a connection at its other end to said leaked-fluid line downstream of said restriction.

5. In combination, a cylinder, a piston reciprocable in said cylinder having a piston rod extended through an end wall of said cylinder, spaced primary and secondary seals in said end wall surrounding said rod, a cavity in said end wall surrounding said rod in the space between said seals for collecting fluid which leaks past said primary seal, a leaked-fluid line connected to said cavity having a fixed restriction therein, means for indicating rate of fluid leakage past said primary seal including an indicator chamber having a fluid pressure responsive member therein, a fluid connection between said indicator chamber below said fluid pressure responsive member and said leaked-fluid line upstream of said restriction therein, and an unobstructed fluid conduit having a connection at one of its ends to said indicator chamber above said fluid pressure responsive member and having a connection at its other end to said leaked-fluid line downstream of said restriction.

6. In combination, a chamber adapted to contain a fluid under pressure, a fluid actuated member in said chamber having a driven member carried thereby and extended through a wall of said chamber, spaced primary and secondary seals in said chamber wall surrounding said driven member, a cavity between said primary and secondary seals for collecting fluid which has leaked past said primary seal, a leaked-fluid line connected to said cavity having a fixed restriction therein, means for indicating rate of fluid leakage past said primary seal including an indicator chamber having a fluid pressure responsive member therein, a fluid connection between said indicator chamber below said fluid pressure responsive member and said leaked-fluid line upstream of said restriction, and an unobstructed fluid conduit having a connection at one of its ends to said indicator chamber above said fluid pressure responsive member and having a connection at its other end to said leaked-fluid line downstream of said restriction.

* * * * *